US008447759B2

(12) United States Patent
Zarzar et al.

(10) Patent No.: US 8,447,759 B2
(45) Date of Patent: May 21, 2013

(54) ASSETS SUGGESTION ACROSS APPLICATIONS

(75) Inventors: Daniel G. Zarzar, Bellevue, WA (US);
Mark David Huentelman, Bellevue, WA (US); Joel W. Varland, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 12/048,207

(22) Filed: Mar. 13, 2008

(65) Prior Publication Data

US 2009/0234808 A1 Sep. 17, 2009

(51) Int. Cl.
*G06F 7/00* (2006.01)
*G06F 17/30* (2006.01)

(52) U.S. Cl.
USPC ............................ 707/727; 707/732; 707/734

(58) Field of Classification Search
None
See application file for complete search history.

(56) References Cited

U.S. PATENT DOCUMENTS

| | | | | |
|---|---|---|---|---|
| 5,361,361 A * | 11/1994 | Hickman et al. | ............... | 715/705 |
| 6,411,971 B1 | 6/2002 | Meier et al. | | |
| 6,477,537 B2 | 11/2002 | Gustman | | |
| 6,563,514 B1 * | 5/2003 | Samar | ............................ | 715/711 |
| 6,573,906 B1 * | 6/2003 | Harding et al. | ................ | 715/705 |
| 6,704,727 B1 * | 3/2004 | Kravets | .................. | 707/999.003 |
| 6,947,959 B1 | 9/2005 | Gill | | |
| 7,095,871 B2 | 8/2006 | Jones et al. | | |
| 7,225,182 B2 * | 5/2007 | Paine et al. | .................... | 707/709 |
| 7,287,214 B1 * | 10/2007 | Jenkins et al. | ................ | 715/205 |
| 7,752,201 B2 * | 7/2010 | Anderson et al. | ............. | 707/731 |
| 7,783,638 B2 * | 8/2010 | Choudhary et al. | ........... | 707/736 |
| 2002/0099790 A1 | 7/2002 | Mosher et al. | | |
| 2004/0003096 A1 * | 1/2004 | Willis | ............................ | 709/228 |
| 2004/0059705 A1 * | 3/2004 | Wittke et al. | ...................... | 707/1 |
| 2004/0230574 A1 * | 11/2004 | Kravets | ............................. | 707/5 |
| 2005/0149504 A1 * | 7/2005 | Ratnaparkhi | ...................... | 707/3 |
| 2005/0154719 A1 * | 7/2005 | Choudhary et al. | ............. | 707/3 |
| 2005/0154986 A1 * | 7/2005 | Bartek et al. | ................... | 715/714 |
| 2006/0041871 A1 | 2/2006 | Friedman et al. | | |
| 2006/0074754 A1 | 4/2006 | Toyohara et al. | | |
| 2006/0143194 A1 | 6/2006 | Stewart et al. | | |
| 2006/0218115 A1 * | 9/2006 | Goodman et al. | ................ | 707/1 |
| 2007/0112861 A1 | 5/2007 | Buczek et al. | | |
| 2007/0214115 A1 * | 9/2007 | Liu et al. | ........................... | 707/3 |

OTHER PUBLICATIONS

"Untangle Your Information . . . Four Steps to Integrating Knowledge with Topic Maps," http://xml.coverpages.org/Innodata-KM-Topicmaps.pdf, *Innodata Isogen White Paper*, pp. 1-12 (Publicly known at least as early as Jun. 11, 2007).

Walter, M., "Architectural Considerations in Digital Asset Management," *The Gilbane Report White Paper*, pp. 1-18 (Oct. 5, 2004).

* cited by examiner

*Primary Examiner* — Mahesh Dwivedi
*Assistant Examiner* — Garrett Smith
(74) *Attorney, Agent, or Firm* — Merchant & Gould (57) ABSTRACT

Suggesting to a user most likely search assets that address a searched topic in each of a number of different software applications is provided. In response to a search for help or general information content associated with a given application, suggested help or general information content associated with a number of different applications or different versions of a given application is provided.

20 Claims, 6 Drawing Sheets

ASSETS SUGGESTION ACROSS APPLICATIONS

BACKGROUND

In a conventional online system, there are various assets such as articles, videos and training courses that describe how to use a particular feature within a particular application. It is often the case that a user will end up in an asset explaining how to accomplish the task the user wants but the asset applies to a different application or a different version of the application. For example, a user may be searching on how to apply a formatting feature to text using a word processing application, but the user may receive a search result asset in the form of an article telling the user how to apply formatting features to text using a slide presentation application. It would be desirable to provide a searching user a helpful asset or help content that addresses the searched topic across a number of different software applications. However, due to the large help content sets and the broad sets of topics covered in the assets in a given online system, it is impractical to relate these assets manually.

It is with respect to these and other considerations that the present invention has been made.

SUMMARY

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

Embodiments of the present invention solve the above and other problems by suggesting to a user assets that address a searched topic in each of a number of different software applications or each of a number of different versions of a given software application. According to one embodiment, using search data, the top N search terms (for example, the top 10 search terms) that led users to a particular asset is computed. Next, particular search terms are related to assets selected in response to those search terms and the frequency of the occurrence of a selection of one or more assets in response to a given term is determined. For example, if a user searches for "formatting" and then clicks on Asset A and Asset B from a list of assets displayed in response to a search on the term "formatting," then the searched term is related to Asset A and to Asset B and the relative frequency of the occurrence of a selection of Asset A and Asset B in response to the search term is determined based on other searches and asset selections for the same searched term. Once this information is determined, when a user selects a particular asset, the top search term that led users to this topic is determined. Next, for assets that apply to one or more other applications for which search assets are available, a determination is made as to those assets that have the same top search term in their search terms list. The topic with the most occurrences for each of the one or more other applications is selected, and suggestions are displayed to the user as to assets that may be of interest to the user for another application.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

This disclosure will now more fully describe embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present invention are directed to suggesting to a user assets that address a searched topic in each of a number of different software applications or each of a number of different versions of a given software application. According to one embodiment, using search data, the top N search terms (for example, the top 10 search terms) that led users to a particular asset is computed. Next, particular search terms are related to assets selected in response to those search terms and the frequency of the occurrence of a selection of one or more assets in response to a given term is determined. For example, if a user searches for "formatting" and then clicks on Asset A and Asset B from a list of assets displayed in response to a search on the term "formatting," then the searched term is related to Asset A and to Asset B and the relative frequency of the occurrence of a selection of Asset A and Asset B in response to the search term is determined based on other searches and asset selections for the same searched term. Once this information is determined, when a user selects a particular asset, the top search term that led users to this topic is determined. Next, for assets that apply to one or more other applications for which search assets are available, a determination is made as to those assets that have the same top search term in their search terms list. The topic with the most occurrences for each of the one or more other applications is selected, and suggestions are displayed to the user as to assets that may be of interest to the user for another application or for a plurality of other applications.

For example, if a user types "2007 template" into a search engine, the user may be presented with an article on a calendar template for a 2007 version of a spreadsheet software application such as Microsoft EXCEL. According to embodiments, a user interface such as a dialog box or drop down menu may be presented that suggests to the user an asset discussing or showing a calendar template for a word processing application such as Microsoft WORD. Thus, an appropriate asset (e.g., help content or article) for another application, application version, and the like is linked to or related to the asset initially provided to the user, and the search and asset selection (e.g., click-through) activities of other users is used to provide a best suggestion of assets and associated applications other users found and selected for the associated search term.

Figure 1:
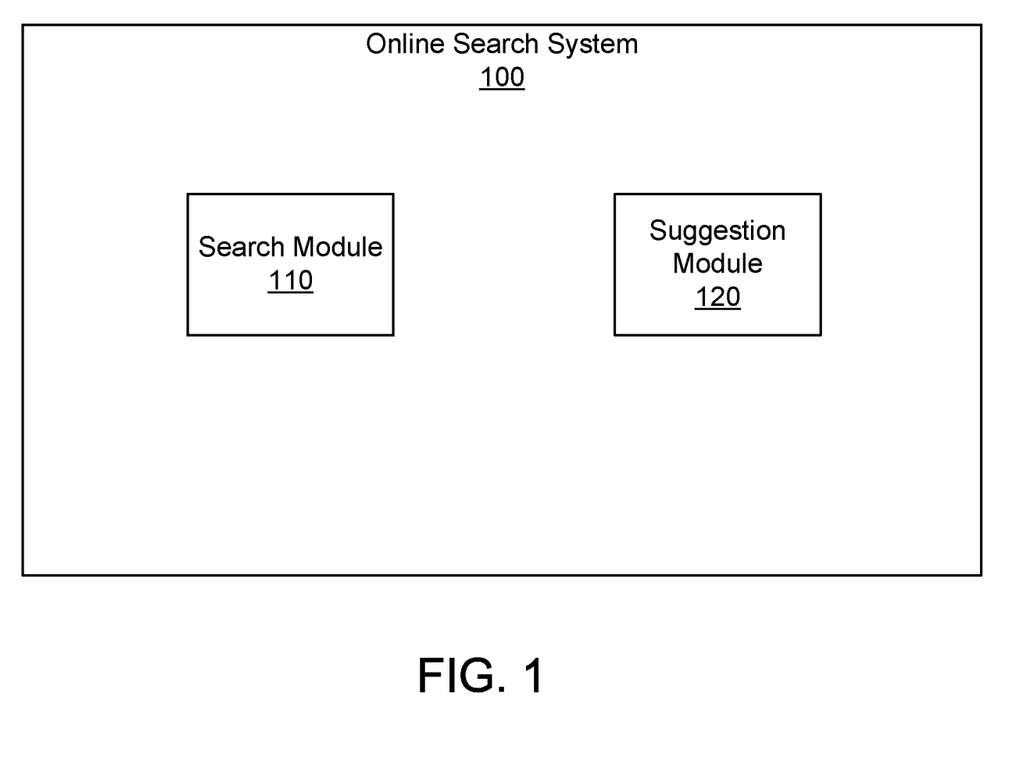
FIG. 1 is a block diagram illustrating an online search system for suggesting to a user assets that address a searched topic in each of a number of different software applications or each of a number of different versions of a given software application.

FIG. 1 is a block diagram illustrating an online search system 100 for suggesting to a user assets that address a searched topic in each of a number of different software applications or each of a number of different versions of a given software application. The online search system 100 may provide a user various and rich assets to search, access and use. In particular, a user may use the online search system 100 to search assets applied in various applications. In one possible embodiment, the online search system 100 may be a Microsoft OFFICE ONLINE system. For example, a user may use the online search system 100 to search assets applied in various software applications such as Microsoft® OFFICE, WORD, POWERPOINT, EXCEL, VISIO, ACCESS, and OUTLOOK software applications. Assets in the online search system 100 may be units of content that help a user and/or describe how to use a particular feature within a particular application. According to one embodiment, assets may be any content accessible by the online search system based on metadata identifying the assets across the various software applications. For example, assets may be articles, tips, templates, training courses, pictures, clip-art, sounds, videos, or any other helpful content that may be of interest or assistance to a user.

The online search system 100 may include a search module 110 and a suggestion module 120. The search module 110 may be programmed to receive a search request from the user with a search term applicable to a given application. The search term may be a keyword or a combination of keywords. The search term may also be any other suitable symbol or item that may be utilized by the online search system 110 for performing a search for assets available to the searching user. After receiving and accepting the search request, the search module 110 may perform a search according to the search request with the search term.

In addition, the search module 110 may be programmed to generate and display search results based on the search term. The search results may include assets associated with the given application. The user may select and review any of the found assets that are of interest to the user. Once the user selects one of the assets, the search module 110 may output and display the selected asset to the user. Of course, the user may select none or more than one interesting asset to review and/or use.

The online search system 100 may include the suggestion module 120 that may be programmed to suggest relevant assets in other applications to a user when a given asset within a given application is presented to the user. In one possible embodiment, the other applications may be different applications from the given application. In another possible embodiment, the other applications may be same applications as the given application but with different versions of the application. The suggestion module 120 may be programmed to suggest to the user the relevant assets relating to the given asset according to data of previous aggregate activities of the present user or other users. The previous aggregate search activities for the present or other users may include activities such as previously used search terms, received search results and selected search assets. The previous aggregate user search data may infer various relationships among the search terms, the assets, and the relative occurrence frequencies that assets are selected in relation to the search terms. The suggestion module 120 may suggest to the searching user the relevant assets relating to the given asset according to the relationships generated from the data of previous aggregate activities of users.

Figure 2:
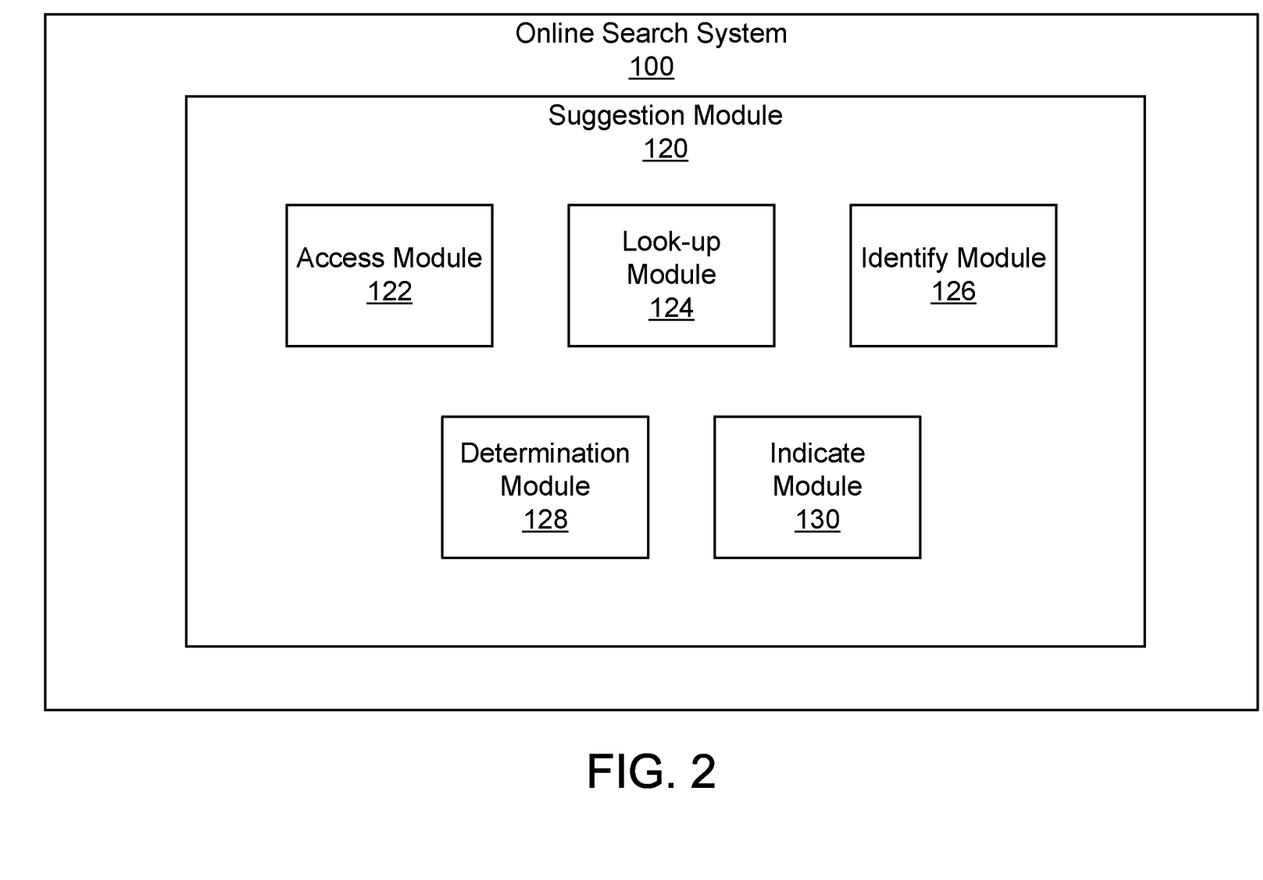
FIG. 2 is a block diagram illustrating a suggestion module of the online search system of FIG. 1 in more detail.

FIG. 2 is a block diagram illustrating the suggestion module 120 of the online search system 100 of FIG. 1 in more detail. The online search system 100 may include the suggestion module 120. The suggestion module 120 may include an access module 122. The access module 122 may be programmed to access pre-determined relationship information of search terms and assets within applications in the online search system 100. The pre-determined relationship information may be pre-determined by relating each search term to each corresponding asset and a relative occurrence frequency in each corresponding application in pre-existing search data. In one possible embodiment, the pre-existing search data may be search click-through data collected from pre-existing aggregate user search activities associated with searched applications. In another possible embodiment, the pre-determined relationship information may be updated when the search click-through data is updated.

In order to further illustrate the suggestion module 120, a non-limiting exemplary pre-determined relationship information that may be accessed in the access module 122 is illustrated in Table 1. In Table 1, the first column includes assets A, B, C, D and E. The second column includes example applications WORD 2003, EXCEL 2003, POWERPOINT, and WORD 2007. The third column includes search terms "watermark", "draft", "printing" and "bold". The fourth column includes occurrences of the example search terms relating to assets, applications and search terms for the associated applications. For example, for generating the exemplary pre-determined relationship information of Table 1 from pre-existing search data, if users searched for "watermark" and then clicked on Asset A and Asset B, then "watermark" is related to Asset A and Asset B and the relative frequency of the occurrence is incremented. Row 2 of Table 2, for example, means that Asset A has been aggregately selected 100 times when users utilized the search term "watermark" to search assets associated with the WORD 2003 application.

TABLE 1

Example Pre-Determined Relationship Information

| Asset ID | Application | Search Term | Occurrences |
| --- | --- | --- | --- |
| A | WORD 2003 | Watermark | 100 |
| A | WORD 2003 | Draft | 80 |
| B | EXCEL 2003 | Printing | 100 |
| B | EXCEL 2003 | Watermark | 70 |
| C | EXCEL 2003 | Watermark | 50 |
| D | POWERPOINT | Bold | 150 |
| D | POWERPOINT | Watermark | 30 |
| E | WORD 2007 | Bold | 50 |
| E | WORD 2007 | Draft | 60 |

The suggestion module 120 may include a look-up module 124. The look-up module 124 may be programmed to look up the most common search term that leads users to the given asset applied to the given application based on the pre-determined relationship information. The most common search term is a search term for which a given asset in a given application has been most frequently selected due to using the search term in the pre-existing aggregate users search activities. For example, referring to Table 1, when a given asset (e.g., Asset A) applied to a given application (e.g., WORD 2003) is presented to the user, the look-up module 124 may look up the most common search term that leads users to Asset A as applied to the WORD 2003 application. According to the example illustrated in Table 1, the most common search term will be found to be "watermark" because Asset A in the WORD 2003 application has been most frequently selected (100 occurrences) due to using the search term "watermark."

The suggestion module 120 may include an identify module 126. The identify module 126 may be programmed to identify which assets within each of other applications have been associated with the most common search term in other applications. For example, in Table 1, as discussed above, the most common search term for Asset A for the application WORD 2003 is the search term "watermark". The identify module 126 may identify Asset B and Asset C associated with the application EXCEL 2003 that have been associated with the most common search term "watermark" for Asset A for the application WORD 2003. Similarly, the identify module 126 may identify Asset D associated with the application POWERPOINT that has been associated with the most common search term "watermark" for the example Asset A for the application WORD 2003.

The suggestion module 120 may include a determination module 128. The determination module 128 may be programmed to determine which one of the assets associated with each corresponding application and associated with the most common search term has the most occurrence frequency. In the example of Table 1, the determination module 128 may determine that Asset B for the application EXCEL 2003 associated with the search term "watermark" has the most occurrence frequency. The determination module 128 may also determine that Asset D for the application POWERPOINT and associated with the search term "watermark" has the most occurrence frequency.

The suggestion module 120 may include an indicate module 130. The indicate module 130 may be programmed to indicate each asset with the most occurrence frequency associated with each corresponding application to the user. In the example of Table 1, the indicate module 130 may indicate Asset B for the application EXCEL 2003 to the user. The indicate module 130 may also indicate Asset D for the application POWERPOINT to the user. In one possible embodiment, the indicate module 130 may be programmed to display a link to each asset with the most occurrence frequency in each corresponding application in a side bar. In another embodiment, the indicate module 130 may be programmed to display each asset with the most occurrence frequency in each corresponding application in a dialog box displayed to the user.

Figure 3:
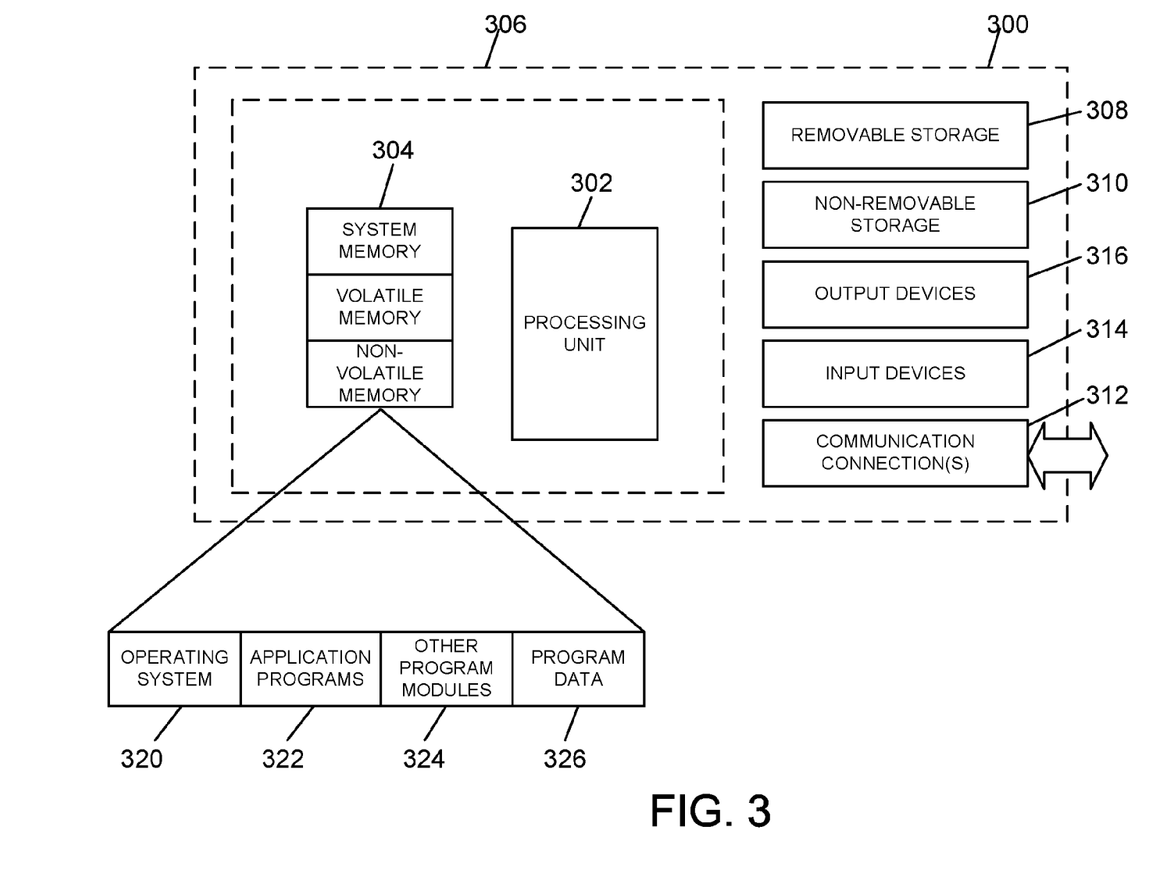
FIG. 3 is a computing system for implementing aspects of the present disclosure.

FIG. 3 is a computing system 300 for implementing aspects of the present disclosure. In its most basic configuration, computing system 300 typically includes at least one processing unit 302 and memory 304. Depending on the exact configuration and type of computing system, memory 304 may be volatile (such as RAM), non-volatile (such as ROM, flash memory, etc.) or some combination of the two. This most basic configuration is illustrated in FIG. 3 by dashed line 306.

Additionally, computing system 300 may also have additional features/functionality. For example, computing system 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and which can be accessed by computing system 300. Any such computer storage media may be part of computing system 300.

Computing system 300 may also contain communications connection(s) 312 that allow the computing system to communicate with other devices. Communications connection(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 300 may also have input device(s) 314 such as keyboard, mouse, pen, voice input device, touch input device, etc. Output device(s) 316 such as a display, speakers, printer, etc. may also be included. For example, the suggestion module 120 and the indicate module 130 may use output device(s) 316 to output results. All these devices are well known in the art and need not be discussed at length here.

In some embodiments, memory 304 includes one or more of operating system 320, application programs 322, other program modules 324, and program data 326. In some embodiments, global data, client-specific data, and transformation rules may each be stored in memory 304, removable storage 308, non-removable storage 310, or any other computer storage media described herein.

Figure 4:
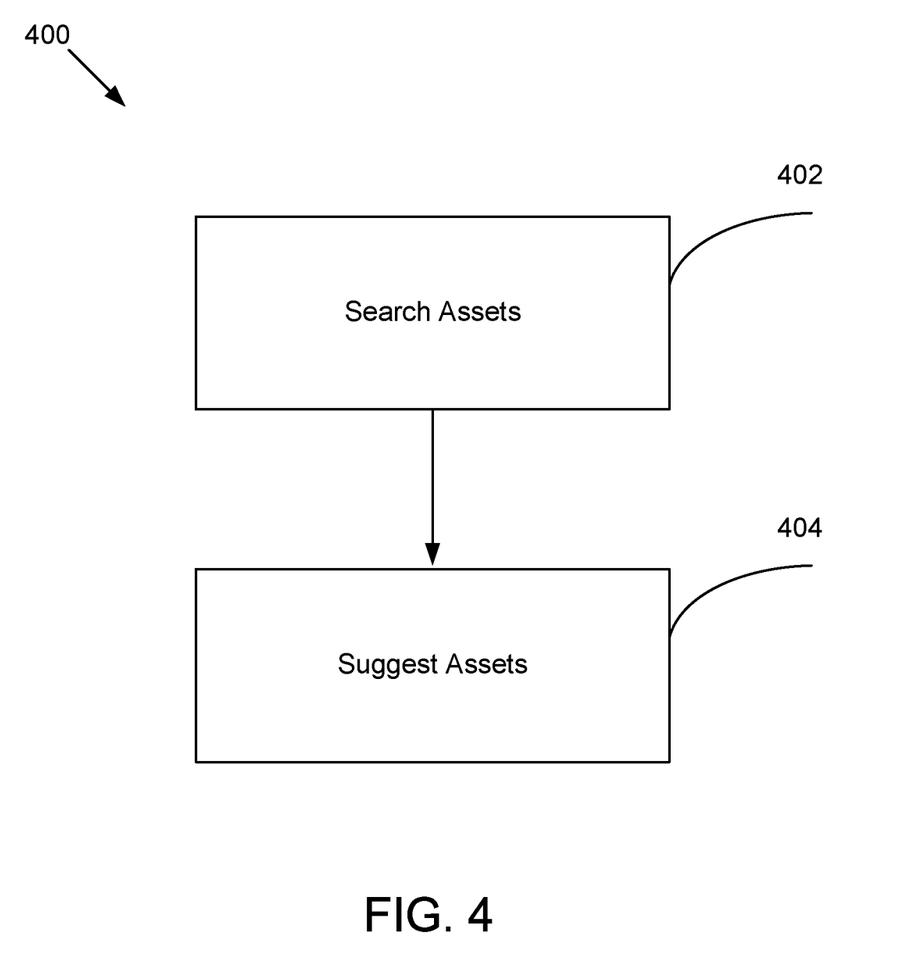
FIG. 4 illustrates a method of suggesting to a user assets that address a searched topic in each of a number of different software applications or each of a number of different versions of a given software application.

FIG. 4 illustrates a method 400 of suggesting to a user assets that address a searched topic in each of a number of different software applications or each of a number of different versions of a given software application. At operation 402, the online search system searches assets associated with a given application in response to one or more search terms. The search term(s) may be a keyword or a combination of keywords. The search term(s) may also be any other suitable symbol or item for the online search system to recognize for performing a search for associated assets. After receiving and accepting the search request, the online search system may perform a search according to the entered search term(s). The online search system may generate search results with assets associated with a given application based on the search term(s). The user may select and review any of the found assets in which he/she is interested. Once the user selects one of the assets, the online search system may output and display the selected asset to the user. Of course, the user may select none or more than one interesting asset to review and/or use. The online search system may output and display any selected asset(s) accordingly.

At operation 404, the online search system suggests related assets to the user when the selected asset for the given application is presented to the user. That is, at operation 404, the online search system suggests assets associated with the entered pre-determined search term(s) that are related to other applications that may be of interest to the user. In one possible embodiment, the relative assets are associated with other applications that are different from the given application. In another possible embodiment, the relative assets are associated with different versions of the given application.

The online search system may suggest to the user the relative assets relating to the selected asset according to data of previous aggregate search activities of users. The previous aggregate search activities may include such information as previously used search terms, received search results and selected search assets. The previous aggregate user search data may infer various relationships among the search terms, the assets, and the relative occurrence frequencies that assets are selected in relation to associated search terms. The online search system may suggest to the user the relative assets relating to the selected asset according to the relationships generated from the data of previous aggregate activities of users.

Figure 5:
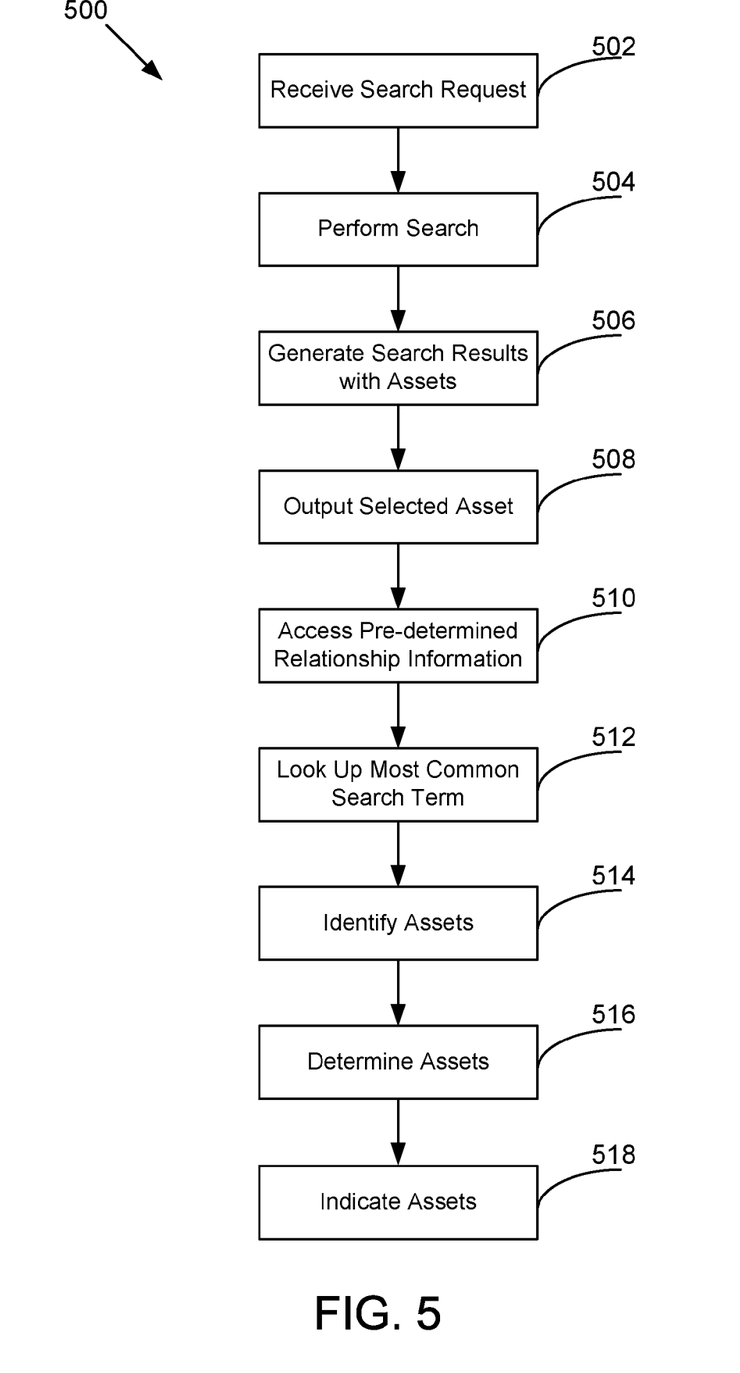
FIG. 5 illustrates another method of suggesting to a user assets that address a searched topic in each of a number of different software applications or each of a number of different versions of a given software application.

FIG. 5 illustrates another method 500 of suggesting to a user assets that address a searched topic in each of a number of different software applications or each of a number of different versions of a given software application. Operational flow starts with operation 502. At operation 502, the online search system may receive a search request from the user with a search term associated with a given application. At operation 504, after receiving and accepting the search request, the online search system may perform a search according to the search request with the search term.

At operation 506, the online search system may generate search results with assets associated with the given application based on the search term. The user may select and review any of the found assets in which the user is interested. At operation 508, the online search system may output and display a selected asset to the user when the user selects one of the assets. Of course, the user may select none or more than one interesting asset to review and/or use, and the online search system may output and display any selected assets accordingly.

At operation 510, the online search system may access pre-determined relationship information of search terms and assets associated within other applications. The pre-determined relationship information may be pre-determined by relating each search term to each corresponding asset and a relative occurrence frequency in each corresponding application in pre-existing search data. In one possible embodiment, the pre-existing search data may be search click-through data collected from pre-existing aggregate search activities associate with the applications. In another possible embodiment, the pre-determined relationship information may be updated when the search click-through data is updated.

At operation 512, the online search system may look up the most common search term that lead users to the selected asset applied to the given application based on the pre-determined relationship information. At operation 514, the online search system may identify which assets within each of other applications have been associated with the most common search term in other applications. At operation 516, the online search system may determine which one of the assets in each corresponding application associated with the most common search term has the most occurrence frequency.

At operation 518, the online search system may indicate each asset with the most occurrence frequency in each corresponding application to the user. In one possible embodiment, the online search system may display a link to each suggested asset with the most occurrence frequency for each corresponding application in a side bar. In another embodiment, the online search system may display each suggested asset with the most occurrence frequency for each corresponding application in a dialog box or other suitable user interface component.

For example, according to one embodiment, using search data, the top N search terms (for example, the top 10 search terms) that led users to a particular asset is computed. Next, particular search terms are related to assets selected in response to those search terms and the frequency of the occurrence of a selection of one or more assets in response to a given term is determined. For example, if a user searches for "formatting" and then clicks on Asset A and Asset B from a list of assets displayed in response to a search on the term "formatting," then the searched term is related to Asset A and to Asset B and the relative frequency of the occurrence of a selection of Asset A and Asset B in response to the search term is determined based on other searches and asset selections for the same searched term. Once this information is determined, when a user selects a particular asset, the top search term that led users to this topic is determined. Next, for assets that apply to one or more other applications for which search assets are available, a determination is made as to those assets that have the same top search term in their search terms list. The topic with the most occurrences for each of the one or more other applications is selected, and suggestions are displayed to the user as to assets that may be of interest to the user for another application(s).

Figure 6:
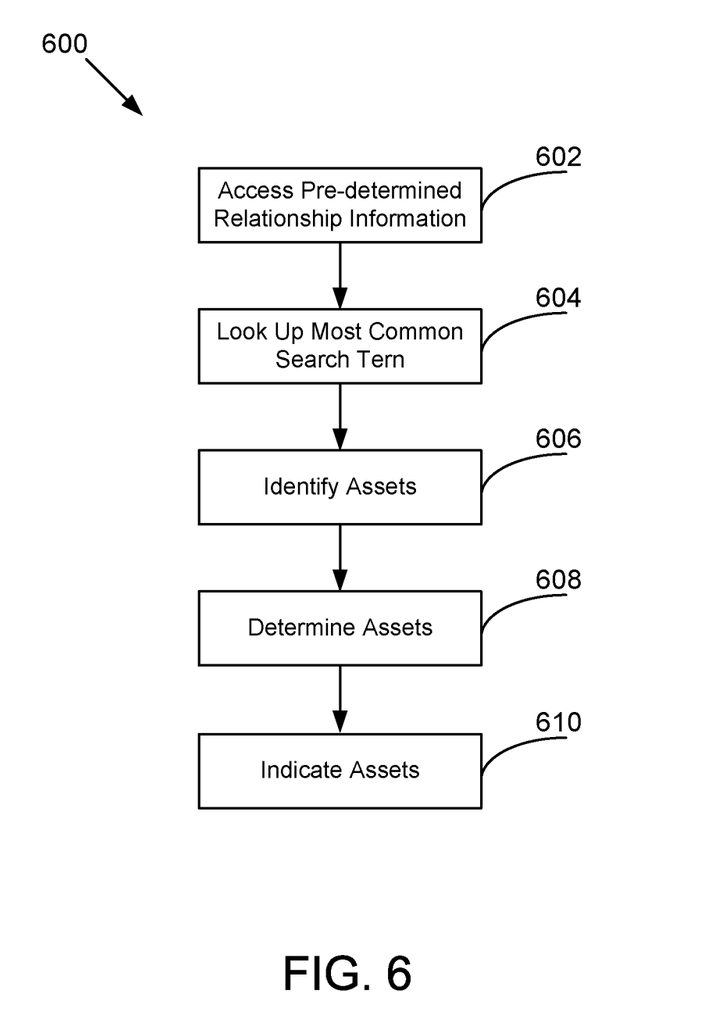
FIG. 6 illustrates another method of suggesting to a user assets that address a searched topic in each of a number of different software applications or each of a number of different versions of a given software application.

FIG. 6 illustrates a method 600 of suggesting to a user assets that address a searched topic in each of a number of different software applications or each of a number of different versions of a given software application. Operations 602-610 in the method 600 of FIG. 6 correspond to operations 510-518 of FIG. 5. The method 600 may start to operate when a given asset is presented to a user. In other words, according to method 600, the manner in which a given asset is first presented to a user or which search mechanism employed by the user is not relevant. In one possible embodiment, the given asset may be presented through a search. In another embodiment, the given asset may be present to the user through other suitable means such as through an Internet navigation or link.

At operation 602, the online search system may access pre-determined relationship information of search terms and assets associated with various applications. The pre-determined relationship information may be pre-determined by relating each search term to each corresponding asset and a relative occurrence frequency for each corresponding application from pre-existing search data. In one possible embodiment, the pre-existing search data may be search click-through data collected from pre-existing aggregate users search activities across the various applications. In another possible embodiment, the pre-determined relationship information may be updated when the search click-through data is updated.

At operation 604, the online search system may look up the most common search term(s) that lead users to the selected asset applied to a given application based on the pre-determined relationship information. The most common search term is a search term associated with the selected asset and associated application where the selected asset has been most frequently selected due to using the search term as shown in the pre-existing aggregate users search activities.

At operation 606, the online search system may identify which assets within each of other applications have been associated with the most common search term in other applications. At operation 608, the online search system may determine which one of the assets in each corresponding application associated with the most common search term has the most occurrence frequency.

At operation 610, the online search system may indicate each asset with the most occurrence frequency for each corresponding application to the user. In one possible embodiment, the online search system may display a link to each suggested asset with the most occurrence frequency in each corresponding application in a side bar. In another embodiment, the online search system may display each suggested asset with the most occurrence frequency for each corresponding application in a dialog box or other suitable user interface component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of suggesting to a user assets that address a searched topic in each of a number of different software applications or each of a number of different versions of a given software application, the method comprising:

receiving a search request with a search term associated with a given application;

performing a search for assets associated with the given application according to the search request;

generating search results with one or more assets for the given application based on the search term;

outputting a selected asset when an asset is selected;

accessing pre-determined relationship information of search terms and associated assets applied to other applications, the pre-determined relationship information being pre-determined by relating each search term to each corresponding asset using a relative occurrence frequency based in part on other searches and asset selections associated with different applications for an input search term in pre-existing search data, the pre-existing search data comprising previous aggregate search activities and the relative occurrence frequency including a number of occurrences that a particular asset was aggregately selected using a common search term;

looking up a most common search term that leads to the selected asset for each of the other applications based on the pre-determined relationship information, the most common search term comprising a search term for which a given asset in a given application has been most frequently selected using the search term according to the previous aggregate search activities;

identifying which assets have been associated with the most common search term in each corresponding application of the other applications;

determining which asset has a most occurrence frequency associated with the most common search term in each corresponding application; and indicating a determined asset with the most occurrence frequency in each corresponding application including using a display to suggest related assets, wherein each determined asset is based in part on a number of occurrences that the related assets were selected for the most common search term in the pre-existing search data as part of providing a suggestion of assets and associated applications including those that other users selected for the most common search term.

2. The method of claim 1, wherein the pre-existing search data is search click-through data collected from previous aggregate user search activities including previously used search terms, received search results, and selected assets associated with the given application and associated with the other applications.

3. The method of claim 2, wherein the pre-determined relationship information is updated when the search click-through data is updated.

4. The method of claim 1, wherein the assets include any content accessible based on metadata identifying the assets across the given application and the other applications.

5. The method of claim 1, wherein indicating the determined asset with the most occurrence frequency in each corresponding application comprises displaying a link to the determined asset in a side bar.

6. The method of claim 1, wherein indicating the determined asset with the most occurrence frequency in each corresponding application comprises displaying the determined asset in a dialog box.

7. A method of suggesting to a user assets that address a searched topic in each of a number of different software applications or each of a number of different versions of a given software application, the method comprising:

accessing pre-determined relationship information of search terms and associated assets applied to the applications, the pre-determined relationship information being pre-determined by relating each search term to each corresponding asset and to a relative occurrence frequency based in part on other searches and asset selections associated with different applications in pre-existing search data, the pre-existing search data comprising previous aggregate search activities and the relative occurrence frequency including a number of occurrences that a particular asset was aggregately selected using a common search term;

looking up a most common search term that leads users to a given asset for a given application based on the pre-determined relationship information, the most common search term comprising a search term for which a given asset in a given application has been most frequently selected using the search term according to pre-existing aggregate user search activities;

identifying which assets have been associated with the most common search term in each of one or more other applications;

determining which asset has a most occurrence frequency associated with the most common search term in each of the one or more other applications; and indicating a determined asset with the most occurrence frequency in each of the one or more other applications including using a display to suggest related assets that are related to the other applications based in part on the number of occurrences that the related assets were selected for the most common search term in the pre-existing search data as part of providing a suggestion of assets and associated applications including those that other users found for the most common search term.

8. The method of claim 7, wherein the pre-existing search data is search click-through data collected from previous aggregate users search activities in the given application and in the one or more other applications.

9. The method of claim 7, wherein each of the search terms is selected from the group comprising: a keyword and a plurality of keywords.

10. The method of claim 7, wherein the one or more other applications are different applications from the given application.

11. The method of claim 7, wherein the one or more other applications are different versions of the given application.

12. The method of claim 7, wherein indicating the determined asset with the most occurrence frequency in each of the one or more other applications to the user comprises displaying a link to the determined asset in a side bar.

13. The method of claim 7, wherein indicating the determined asset with the most occurrence frequency in each of the one or more other applications to the user comprises displaying the determined asset in a dialog box.

14. An online search computer system for suggesting to a user assets that address a searched topic in each of a number of different software applications or each of a number of different versions of a given software application, the system comprising:
   an access module programmed to access pre-determined relationship information of search terms and assets applied to the one or more applications, the pre-determined relationship information being pre-determined by relating each search term to each corresponding asset and a relative occurrence frequency based in part on other searches and asset selections associated with different applications for an input search term in pre-existing search data comprising previous aggregate search activities and the relative occurrence frequency including a number of occurrences that a particular asset was aggregately selected using a common search term;
   a look-up module programmed to look up a most common search term that leads users to a given asset applied to a given application based on the pre-determined relationship information, the most common search term comprising a search term for which a given asset in a given application has been most frequently selected using the search term according to pre-existing aggregate user search activities;
   an identify module programmed to identify which assets have been associated with the most common search term for each of the one or more applications;
   a determination module programmed to determine which asset has a most occurrence frequency associated with the most common search term for each of the one or more applications;
   an indicate module programmed to indicate a determined asset with the most occurrence frequency for each of the one or more applications; and
   a display to display related asset suggestions for related assets associated with the other applications based in part on a number of occurrences that the related assets were selected for the most common search term in the pre-existing search data as part of providing a suggestion of assets and associated applications including those that other users selected for the most common search term.

15. The system of claim 14, wherein the pre-existing search data is search click-through data collected from previous aggregate users search activities associated with the given application and associated with the one or more other applications.

16. The system of claim 14, wherein the assets include any content accessible based on metadata identifying the assets across the given application and the other applications.

17. The system of claim 14, wherein each of the search terms is selected from the group comprising: a keyword and a plurality of keywords.

18. The system of claim 14, wherein the indicate module is programmed to display a link to the determined asset with the most occurrence frequency for each of the one or more applications in a side bar.

19. The system of claim 14, wherein the indicate module is programmed to display the determined asset with the most occurrence frequency for each of the one or more applications in a dialog box.

20. The system of claim 14, wherein the one or more applications comprise different versions of the given application.

* * * * *